United States Patent
Wolfe et al.

(10) Patent No.: US 12,387,056 B2
(45) Date of Patent: Aug. 12, 2025

(54) EMOJI SANITIZATION FOR NATURAL LANGUAGE MODEL PROCESSING

(71) Applicant: Capital One Services, LLC, McLean, VA (US)

(72) Inventors: Nathan Wolfe, Silver Spring, MD (US); Andy Luo, Vienna, VA (US)

(73) Assignee: Capital One Services, LLC, McLean, VA (US)

(*) Notice: Subject to any disclaimer, the term of this patent is extended or adjusted under 35 U.S.C. 154(b) by 328 days.

(21) Appl. No.: 18/062,910

(22) Filed: Dec. 7, 2022

(65) Prior Publication Data

US 2024/0193374 A1     Jun. 13, 2024

(51) Int. Cl.
G06F 40/30         (2020.01)
G06F 40/284        (2020.01)
G06F 40/40         (2020.01)

(52) U.S. Cl.
CPC ............ G06F 40/40 (2020.01); G06F 40/284 (2020.01); G06F 40/30 (2020.01)

(58) Field of Classification Search
CPC .............................. G06F 40/284; G06F 40/30
USPC ............................................................. 704/9
See application file for complete search history.

(56) References Cited

U.S. PATENT DOCUMENTS

| | | | |
|---|---|---|---|
| 2018/0336184 A1 | 11/2018 | Bellegarda et al. | |
| 2020/0066391 A1* | 2/2020 | Sachdeva | G16H 20/40 |
| 2021/0112075 A1* | 4/2021 | Cunningham | G06F 21/566 |
| 2021/0226983 A1* | 7/2021 | Cunningham | H04L 63/102 |
| 2021/0326527 A1* | 10/2021 | Poirel | G06F 21/316 |
| 2021/0342441 A1* | 11/2021 | Ross | G06F 21/316 |
| 2022/0006818 A1* | 1/2022 | Cunningham | H04L 63/205 |
| 2022/0115137 A1* | 4/2022 | Goldstein | G16H 10/60 |
| 2022/0269354 A1* | 8/2022 | Prasad | H04L 51/04 |

OTHER PUBLICATIONS

J. U. Kundale and N. J. Kulkarni, "Language Independent Multi-Class Sentiment Analysis," 2019 5th International Conference on Computing, Communication, Control and Automation (ICCUBEA), Pune, India, 2019, pp. 1-7, doi: 10.1109/ICCUBEA47591.2019.9128383. keywords: {Sentimental Analysis;Muti-class Sent (Year: 2019).*

S. Kusal, S. Patil, J. Choudrie, K. Kotecha, S. Mishra and A. Abraham, "AI-Based Conversational Agents: A Scoping Review From Technologies to Future Directions," in IEEE Access, vol. 10, pp. 92337-92356, 2022, doi: 10.1109/ACCESS.2022.3201144. keywords: {Natural languages;Artificial intelligence; Sent (Year: 2022).*

* cited by examiner

Primary Examiner — Bharatkumar S Shah
(74) Attorney, Agent, or Firm — Harrity & Harrity, LLP

(57) ABSTRACT

In some implementations, a device may obtain a natural language input including an emoji. The device may identify one or more appearance modifiers associated with the emoji. The device may generate a token associated with the emoji that removes the one or more appearance modifiers, wherein the token is associated with multiple emojis including the emoji, and wherein the token is a modified code associated with the emoji or is associated with a cluster that is associated with the multiple emojis. The device may provide, to a natural language processing (NLP) model, the token associated with the emoji. The device may obtain, from the NLP model, an output that indicates an interpretation of the natural language input based on providing the token to the NLP model.

20 Claims, 7 Drawing Sheets

EMOJI SANITIZATION FOR NATURAL LANGUAGE MODEL PROCESSING

BACKGROUND

Natural language processing (NLP) is associated with the interactions between computers and human language. For example, NLP is associated with how computers process and analyze natural language data. A transformer is a deep learning model that adopts the mechanism of self-attention, differentially weighting the significance of each part of the input data. Transformer models may be used in NLP to process sequential input data, such as natural language, with applications towards tasks such as translation and text summarization.

SUMMARY

Some implementations described herein relate to a system for emoji sanitization for natural language model processing. The system may include one or more memories and one or more processors communicatively coupled to the one or more memories. The one or more processors may be configured to obtain a natural language input including an emoji, wherein the emoji is associated with an appearance modifier. The one or more processors may be configured to generate a model input associated with the emoji based on an emoji identifier associated with the emoji, wherein the model input is associated with multiple emojis including the emoji, wherein the model input sanitizes the emoji by removing an indication of the appearance modifier, and wherein the multiple emojis are associated with a semantic meaning cluster. The one or more processors may be configured to provide, to a natural language processing (NLP) model, the model input associated with the emoji. The one or more processors may be configured to obtain, from the NLP model and based on providing the model input to the NLP model, an output that indicates a semantic meaning of the natural language input.

Some implementations described herein relate to a method for emoji sanitization for natural language model processing. The method may include obtaining, by a device, a natural language input including an emoji. The method may include identifying, by the device, one or more appearance modifiers associated with the emoji. The method may include generating, by the device, a token associated with the emoji that removes the one or more appearance modifiers, wherein the token is associated with multiple emojis including the emoji, and wherein the token is a modified code associated with the emoji or is associated with a cluster that is associated with the multiple emojis. The method may include providing, by the device and to an NLP model, the token associated with the emoji. The method may include obtaining, by the device and from the NLP model, an output that indicates an interpretation of the natural language input based on providing the token to the NLP model.

Some implementations described herein relate to a non-transitory computer-readable medium that stores a set of instructions for a device. The set of instructions, when executed by one or more processors of the device, may cause the device to obtain a natural language input including an emoji, wherein the emoji is associated with an appearance modifier. The set of instructions, when executed by one or more processors of the device, may cause the device to generate a model input associated with the emoji based on an identifier associated with the emoji, wherein the model input is associated with multiple emojis including the emoji, wherein the model input does not indicate the appearance modifier, and wherein the multiple emojis are associated with a semantic meaning cluster. The set of instructions, when executed by one or more processors of the device, may cause the device to provide, to an NLP model, the model input associated with the emoji. The set of instructions, when executed by one or more processors of the device, may cause the device to obtain, from the NLP model, an output that indicates a semantic meaning of the natural language input based on providing the model input to the NLP model.

DETAILED DESCRIPTION

Figure 1A:
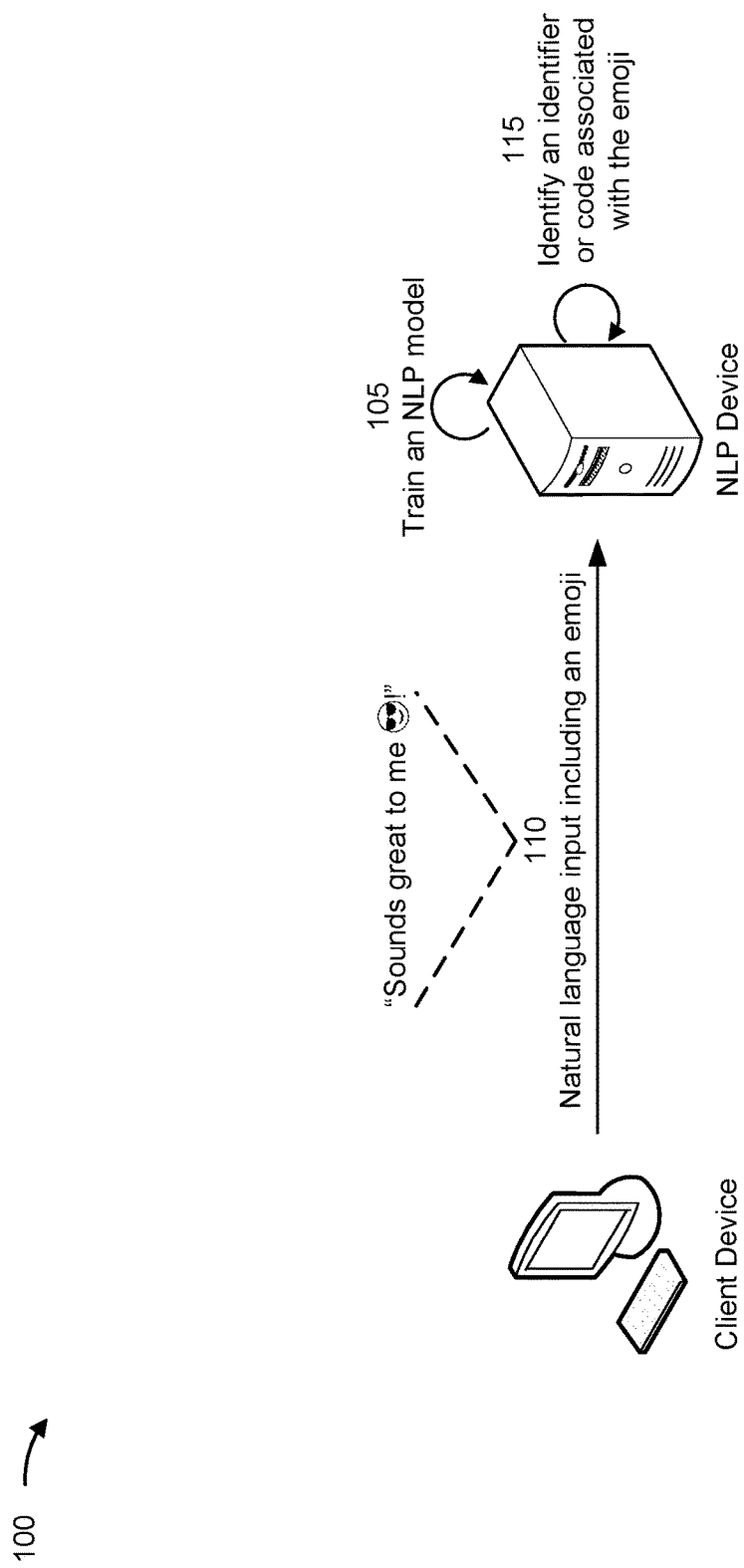
FIGS. 1A-1C are diagrams of an example associated with emoji sanitization for natural language model processing, in accordance with some embodiments of the present disclosure.

The following detailed description of example implementations refers to the accompanying drawings. The same reference numbers in different drawings may identify the same or similar elements.

Natural language processing (NLP) is associated with enabling machines (e.g., devices and/or computers) to understand text and/or spoken words in a similar manner as a human. NLP combines computational linguistics (e.g., rule-based modeling of human language) with statistical, machine learning, and/or deep learning models. Together, these technologies enable machines to process natural language (e.g., human language) in the form of text or voice data to enable such machines to "understand" the natural language's full meaning and the speaker or writer's intent and/or sentiment. However, NLP models (e.g., that are trained to process natural language) may be complex due to the difficulties in accurately determining an intended meaning (e.g., a semantic meaning) of text or voice data. For example, homonyms, homophones, sarcasm, idioms, metaphors, grammar and usage exceptions, and/or variations in sentence structure, among other examples, may cause NLP models to be complex.

In some examples, an NLP model may include a transformer model. The transformer model may be a deep learning model that uses self-attention to differentially weight the significance of each part of input data. A transformer model may be trained to learn and/or identify contextual relations between words (or sub-words) in a natural language text input. A transformer model may include an encoder that reads a natural language text input and a decoder that outputs a prediction for a task. The encoder may obtain an input as a sequence of tokens (e.g., corresponding to words or sub-words in a natural language text input). The sequence of tokens may be embedded into vectors and then processed in a neural network. The output of the transformer model may be a sequence of vectors in which each vector corresponds to an input token with the same index. One example of a transform model used for NLP is a bidirectional encoder representations from transformers (BERT) model. A BERT model may apply bidirectional (or non-directional) training of a transformer model (e.g., in contrast to other transformer models which are trained using text sequences either from left to right or combined left-to-right and right-to-left training).

An emoji may be used by a user to express emotion, thoughts, and/or feelings in a message or a text. For example, an emoji may include pictogram, logogram, ideogram, an emoticon, an image, and/or a smiley embedded in text. Emojis may include a visual representation of an emotion, an object, and/or a symbol, among other examples. For example, an emoji may be used to indicate happiness (e.g., using a smiling face emoji), sadness (e.g., using a crying emoji or a frowning face emoji), approval (e.g., using a thumbs up emoji), and/or love or affection (e.g., using a heart emoji or with an emoji depicting a face with hearts for eyes), among other examples. Therefore, understanding a semantic meaning associated with an emoji is a key factor in understanding a natural language input that includes one or more emojis.

As a result, NLP models, such as transformer models or BERT models, may be trained to recognize and/or understand a meaning, emotion, and/or thought associated with a given emoji. However, there are thousands of different emojis having different meanings and/or different meanings in different contexts. As a result, training NLP models to recognize and/or understand high quantities of emojis introduces significant training overhead (e.g., thereby consuming computing resources, processing resources, and/or memory resources associated with training the NLP model) and/or increases a complexity of the NLP model (e.g., thereby consuming computing resources, processing resources, and/or memory resources associated with executing the NLP model).

For example, each emoji may be associated with respective inputs and/or tokens for the NLP model. Training the NLP model to recognize and/or understand thousands of inputs and/or tokens for respective emojis introduces significant training overhead and/or increases a complexity of the NLP model. Additionally, multiple emojis are often associated with the same meaning and/or emotion. For example, a single emoji may be associated with appearance modifiers that result in multiple emojis differing only by the appearance modifier. For example, a skin tone modifier may modify a skin tone of an emoji or a color modifier may modify a color of an emoji. This increases the quantity of inputs and/or tokens to be trained for the NLP model, thereby increasing the training overhead and/or increasing the complexity of the model. Additionally, training separate tokens or inputs for emojis having the same or similar meaning (e.g., a separate token for each skin tone of a smiley face emoji or for each color of a heart emoji) may result in an output of the NLP model being different for different emojis having the same or similar meaning, thereby reducing the accuracy of the NLP model. For example, this may introduce the appearance of implicit bias in an output of the NLP model. For example, different outputs for inputs of emojis differing only by an appearance modifier (e.g., a skin tone modifier or a color modifier) may result in the appearance of a bias in the NLP model.

Some implementations described herein enable emoji sanitization for natural language model processing. For example, an NLP device may obtain a natural language input including an emoji. In some implementations, the emoji may be associated with an appearance modifier, as described in more detail elsewhere herein. The NLP device may generate a model input (e.g., a token) associated with the emoji. In some implementations, the model input may be based on an emoji identifier (e.g., an embedded code in the natural language input) associated with the emoji. In some implementations, the model input is associated with multiple emojis including the emoji (e.g., where the multiple emojis are associated with the same or similar semantic meaning or emotion).

For example, the multiple emojis may be associated with a semantic meaning cluster (e.g., a cluster output by a machine learning model that is trained to categorize similar emojis into a given semantic meaning cluster). In some implementations, the model input may sanitize the emoji by removing an indication of the appearance modifier and/or variations of the emoji that do not alter the semantic meaning of the emoji. The NLP device may provide, to an NLP model, the model input (e.g., the token) associated with the emoji. The NLP device may obtain, from the NLP model and based on providing the model input to the NLP model, an output that indicates a semantic meaning of the natural language input. In some implementations, the NLP device may generate and/or output, based on the semantic meaning of the natural language input, a response (e.g., a text response or a voice response) to the natural language input.

As a result, a training overhead and/or a complexity of the NLP model is reduced based on sanitizing emojis before providing an input for the emoji to the NLP model. For example, the sanitization of emojis, as described in more detail elsewhere herein, may reduce a quantity of model inputs and/or tokens that are trained to enable the NLP model to recognize and/or understand emojis in connection with natural language inputs. This may conserve computing resources, processing resources, and/or memory resources, among other examples, associated with training and/or executing the NLP model. Additionally, the sanitization of emojis, as described in more detail elsewhere herein, may improve an accuracy of outputs of the NLP model may ensuring that different emojis having the same or similar semantic meaning are associated with the same output from the NLP model (e.g., two emojis that are identical except for differing colors may be associated with the same input to the NLP model, thereby ensuring that the output of the NLP model is the same for both emojis).

Figure 1B:
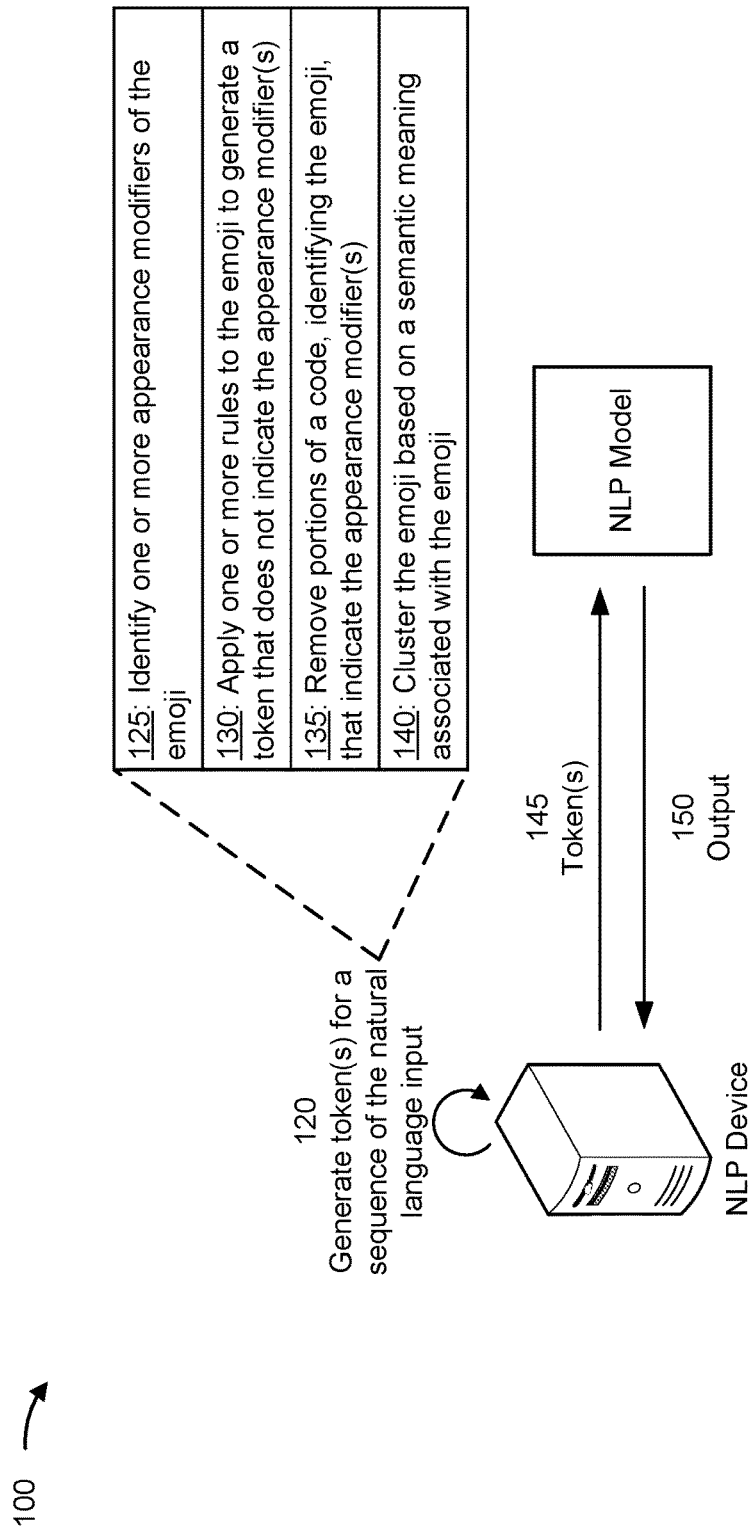
Figure 1C:
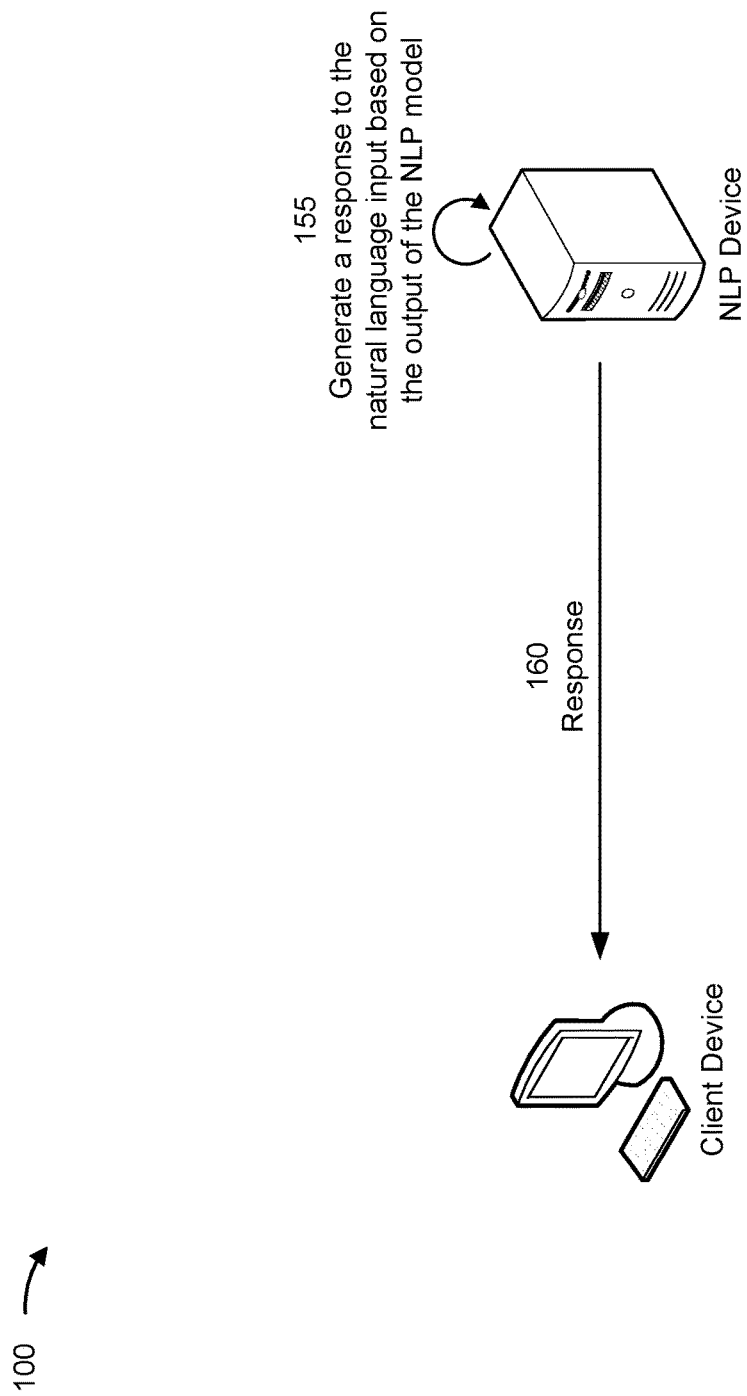

FIGS. 1A-1C are diagrams of an example 100 associated with emoji sanitization for natural language model processing. As shown in FIGS. 1A-1C, example 100 includes an NLP device and a client device. These devices are described in more detail in connection with FIGS. 3 and 4.

The NLP device may be associated with processing natural language inputs. For example, the NLP device may be associated with an application that is used to conduct an online chat conversation via text or text-to-speech (e.g., a chatbot). As another example, the NLP device may be associated with a smart assistance device, such as a voice assistant. Additionally, or alternatively, the NLP device may be associated with a call center or helpdesk (e.g., where the NLP device facilitates the processing of natural language inputs to the call center or helpdesk). In other words, the NLP device may facilitate any application, entity, and/or device, that is associated with performing NLP of natural language inputs (e.g., text inputs and/or voice inputs).

As shown in FIG. 1A, and by reference number 105, the NLP device may train an NLP model using model inputs and/or tokens that are common to multiple emojis. For example, the NLP device may train the NLP model using one or more model inputs or tokens that are associated with respective semantic meaning clusters of emojis. For example, the NLP device may generate or obtain one or more semantic meaning clusters. A semantic meaning cluster may be a cluster or group of emojis associated with the same, or similar, semantic meaning. In some implementations, each semantic meaning cluster may be associated with a single model input or token for the NLP model. As another example, the model inputs and/or tokens may include a code (e.g., an embedded code) that identifies an emoji with any appearance modifiers indicated by the code being removed. For example, a portion of a code associated with an emoji may result in the same emoji with different colors or versions depending on the information included in the portion of the code. Therefore, the NLP device may train the NLP model using model inputs or sequences that are based on the code with the portion of the code removed (e.g., to sanitize the inputs by removing indications of appearance modifiers associated with a given emoji). In other words, the NLP device may train the NLP model to recognize emojis based on the semantic meanings of the emojis rather than to recognize or understand each individual emoji (e.g., by being trained using inputs or sequences that apply to multiple emojis having the same, or similar, semantic meaning).

In some implementations, the NLP device may obtain or receive a trained NLP model. For example, another device may train the NLP model in a similar manner described elsewhere herein. The NLP device may obtain or receive, from the other device, the trained NLP model that is trained using one or more model inputs or tokens that are associated with respective semantic meanings of emojis, rather than separate model inputs or tokens for each version or modified appearance of the emojis.

As shown by reference number 110, the client device may provide (or transmit), and the NLP device may obtain (or receive), a natural language input including an emoji. For example, the natural language input may be a text input (e.g., a text message or other text that is input by a user into the client device). In some implementations, the natural language input may include a voice input (e.g., a voice-to-text input). For example, the client device may obtain all, or a part, of the natural language input via a voice input from a user. The client device and/or the NLP device may process the voice input to obtain the natural language input. In some implementations, the natural language input may include one or more words and one or more emojis. In other examples, the natural language input may only include one or more emojis (e.g., and no words). As an example, and as shown in FIG. 1A, the natural language input may include the words "Sounds great to me" along with an emoji of a face with sunglasses on.

In some implementations, an emoji, included in the natural language input, may be associated with an appearance modifier. An appearance modifier may be a modifier of an emoji that changes an appearance of the emoji as displayed on a device, such as the client device. For example, an appearance modifier may include a color modifier (e.g., that changes a color of the emoji as displayed), a skin tone modifier (e.g., that changes a skin tone of the emoji as displayed), and/or a version modifier (e.g., that changes a version of the emoji as displayed), among other examples.

For example, a waving hand emoji (e.g., depicting a waving hand) may be associated with an appearance modifier that can modify the appearance of the emoji from no skin tone (e.g., a default color), to a light skin tone, a medium-light skin tone, a medium skin tone, a medium-dark skin tone, and/or a dark skin tone. As another example, an emoji depicting a man may be associated with an appearance modifier that can modify a color of the hair of the man depicted by the emoji. As another example, an emoji depicting a heart may be associated with an appearance modifier that can modify a color of the heart depicted by the emoji.

In some implementations, the appearance modifiers and/or the emojis may be defined by Unicode (sometimes referred to as the Unicode Standard). Unicode provides a unique number for every character (e.g., language characters, symbols, and/or emojis), no matter what platform, device, application or language such that character encoding across platforms, devices, languages, and/or applications do not conflict with one another. For example, Unicode may define different emojis and/or different appearance modifiers for respective emojis.

As shown by reference number 115, the NLP device may identify an identifier or a code associated with an emoji included in the natural language input. For example, as described elsewhere herein, an emoji may be associated with an embedded code (e.g., a code point). The embedded code may be a hexadecimal code, a decimal code, a cascading style sheets (CSS) code, and/or a hypertext markup language (HTML) code, among other examples. For example, the code may be defined by Unicode. A code defined by Unicode may be referred to as a Unicode character. For example, a hexadecimal code of "1F44B" may be associated with a waving hand sign emoji (e.g., a hand waving emoji). The natural language input may include the code associated with a given emoji embedded in the natural language input. The code may enable the NLP device to identify the emoji and/or information associated with the emoji.

For example, in some cases, the code may include an appearance modifier code. For example, a hexadecimal code may be defined for one or more appearance modifiers, such as a skin tone modifier, a color modifier, and/or a hair color modifier, among other examples. For example, Unicode defines hexadecimal codes for skin tone modifiers (e.g., using the Fitzpatrick scale). For example, a hexadecimal code of "1F3FF" may be associated with an emoji modifier Fitzpatrick Type-6 (e.g., to modify a skin tone of an emoji to the Type-6 skin tone as defined by the Fitzpatrick scale). As another example, a hexadecimal code of "1F9B0" may be associated with an emoji component of red hair (e.g., to modify a hair color of an emoji to be red).

As shown in FIG. 1B, and by reference number 120, the NLP device may generate one or more tokens for a sequence of the natural language input. For example, the NLP device may tokenize the natural language input into one or more tokens. For example, each word, emoji, and/or symbol included in the natural language input may be associated with respective tokens. For example, tokenization may enable the NLP device to transform an unstructured string (e.g., the natural language text input) into a numerical data structure suitable for NLP. Tokenization may enable the NLP device to separate sentences, words, characters, and/or emojis into separate tokens. In some implementations, the NLP device may use white space tokenization (e.g., associated with using a whitespace in a string as a delimiter of words), Natural Language Toolkit (NLTK) tokenization, word and sentence tokenization, and/or punctuation-based tokenization, among other examples.

For example, the NLP device may generate a token (e.g., also referred to herein as a model input) for each emoji included in the natural language input. The NLP device may remove appearance modifiers and/or identify a semantic meaning associated with the emoji to sanitize the emoji prior to generating the token. In other words, the token for an emoji may be generated based on a default version (e.g., without appearance modifiers), a semantic meaning, a category, and/or a cluster associated with the emoji. For example, the token for an emoji should be the same regardless of an appearance modifier associated with the emoji. In other words, the token for an emoji may identify the semantic meaning of the emoji such that the token represents or identifies multiple emojis with the same, or similar, semantic meaning. For example, there may be multiple different versions of a heart emoji, but the NLP device may generate the same token for multiple (or all) versions of the heart emoji.

For example, as shown by reference number 125, the NLP device may identify one or more appearance modifiers of an emoji. For example, the NLP device may identify the one or more appearance modifiers based on a code associated with the emoji. For example, as described elsewhere herein, the code may be an embedded code in the natural language input identifying the emoji (e.g., a hexadecimal code or a Unicode character). The code may include one or more portions identifying the one or more appearance modifiers of the emoji. For example, a code embedded in the natural language input may be "1F44B 1F3FE" identifying a waving hand emoji with an emoji modifier of Fitzpatrick Type-5 (e.g., modifying an appearance of the waving hand emoji to have a skin tone of Fitzpatrick Type-5). For example, the portion of the code "1F44B" may identify the waving hand emoji and the portion of the code "1F3FE" may identify the emoji modifier of Fitzpatrick Type-5. Therefore, the NLP device may identify that the emoji is associated with the appearance modifier of the emoji modifier of Fitzpatrick Type-5 based on interpreting the portion of the code "1F3FE."

As another example, a code embedded in the natural language input may be "1F468 1F9B1" identifying a man emoji with an emoji component of curly hair (e.g., modifying an appearance of the man emoji to have curly hair). For example, the portion of the code "1F468" may identify the man emoji and the portion of the code "1F9B1" may identify the emoji component of curly hair. Therefore, the NLP device may identify that the emoji is associated with the appearance modifier of the emoji component of curly hair based on interpreting the portion of the code "1F9B1."

Additionally, or alternatively, the NLP device may identify the one or more appearance modifiers based on an image analysis of the emoji. For example, the NLP device may analyze an image of the emoji to identify the one or more appearance modifier. For example, the NLP device may use an image analysis model that is trained to identify appearance modifiers of emojis. For example, the image analysis may enable the NLP device to identify a skin tone modifier, a color modifier, a hair component modifier, a version modifier, and/or other appearance modifiers of emojis. For example, the NLP device may perform color image processing on an image of the emoji to identify a color and/or skin tone of the emoji. The NLP device may use a computer vision model to process the image of the emoji and identify a hair type or other appearance modifier of the emoji.

As shown by reference number 130, the NLP device may apply one or more rules to the emoji to generate a token that does not indicate any appearance modifiers associated with the emoji. For example, the one or more rules may indicate that the NLP device is to filter out information identifying appearance modifiers of the emoji prior to generating the code for the emoji. For example, as shown by reference number 135, the NLP device may remove portions of a code, identifying the emoji, that indicate the one or more appearance modifiers. For example, the NLP device may remove the code corresponding to the appearance modifier from the emoji identifier associated with the emoji to generate the token. In some implementations, the NLP device may generate the token (e.g., the model input) using a modified code associated with the emoji. For example, the NLP device may remove a portion of the code corresponding to the one or more appearance modifiers to obtain the modified code.

As an example, first emoji may be associated with a code embedded in the natural language input of "1F44B 1F3FE" identifying a waving hand emoji with an emoji modifier of Fitzpatrick Type-5 (e.g., modifying an appearance of the waving hand emoji to have a skin tone of Fitzpatrick Type-5). A second emoji may be associated with a code embedded in the natural language input of "1F44B 1F3FC" identifying a waving hand emoji with an emoji modifier of Fitzpatrick Type-3 (e.g., modifying an appearance of the waving hand emoji to have a skin tone of Fitzpatrick Type-3). The one or more rules may indicate that the NLP device is to remove the portions of the code associated with appearance modifiers (e.g., "1F3FE" and "1F3FC"). Therefore, the first emoji and the second emoji may both be associated with the same token (e.g., the same model input) because the NLP device generates the model input based on the same modified code of "1F44B" which identifies the waving hand emoji (e.g., without any appearance modifiers). As a result, the NLP device may sanitize the emoji by removing indications of appearance modifiers before generating the token for the emoji, resulting in the same token for emojis differing only by appearance modifiers.

This may reduce a quantity of tokens needed for emojis, thereby reducing a complexity of the NLP model and/or the NLP of the natural language input. For example, regardless of appearance modifier(s) applied to an emoji, the NLP device will generate the same token for all versions of the emoji (e.g., with different appearance modifiers). Additionally, this reduces a likelihood that the NLP model will generate a different output for the same emoji with different appearance modifiers. For example, because the waving hand emoji with an emoji modifier of Fitzpatrick Type-5 and the waving hand emoji with an emoji modifier of Fitzpatrick Type-3 are associated with the same token, the NLP model will generate the same output for each emoji (e.g., for the waving hand emoji regardless of the skin tone modifier applied to the emoji).

Additionally, or alternatively, as shown by reference number 140, the NLP device may generate the token for the emoji based on clustering the emoji. For example, the NLP device may cluster the emoji based on a semantic meaning or category associated with the emoji. Each cluster may be associated with a single token (e.g., a single model input). For example, the NLP device may classify, based on one or more rules and the emoji identifier (e.g., the code) associated with the emoji, the emoji into a semantic meaning cluster. The NLP device may identify the token for the emoji based on the semantic meaning cluster (e.g., based on the token associated with the semantic meaning cluster). For example, the token (e.g., model input) may be a common input for all emojis grouped into the same cluster.

In some implementations, the clusters may be based on semantic meanings associated with emojis. For example, a cluster may include a negative emotion cluster, a happy cluster, a sad cluster, a laughing cluster, and/or an angry cluster, among other examples. In some implementations, the clusters may be based on categories that are defined, or otherwise fixed, by Unicode. For example, a standard promulgated by Unicode may define one or more categories. A cluster may be associated with emojis that are included in a given category as defined, or otherwise fixed, by Unicode. For example, categories and/or clusters may include a face-smiling cluster (e.g., for emojis depicting smiling faces), a face-affection cluster (e.g., for emojis depicting a face showing affection), a face-sleepy cluster (e.g., for emojis depicting a face that indicates tiredness), a face-negative cluster (e.g., for emojis depicting a face with a negative emotion), a heart cluster (e.g., for emojis depicted a heart), an animal-reptile cluster (e.g., for emojis depicting a reptile), an animal-bug cluster (e.g., for emojis depicting a bug), and/or a food-sweet cluster (e.g., for emojis depicting sweet food, such as ice cream or candy), among other examples.

In some implementations, the NLP device may cluster the emoji using a machine learning model. For example, the NLP device may provide the natural language input to a machine learning model. The machine learning model may be trained to identify semantic meanings of emojis. For example, the machine learning model may be trained to identify a meaning of an emoji based on a context of words and/or punctuation included in the natural language input. For example, the NLP device may group the emoji into the semantic meaning cluster based on an output of the machine learning model. The training and operation of the machine learning model is described in more detail in connection with FIG. 2.

In some implementations, the NLP device may perform image analysis of the emoji to determine one or more display parameters associated with the emoji. In some implementations, the display parameters may be similar to the appearance modifiers. The display parameters may include a color of the emoji and/or a shape of the emoji, among other examples. The NLP device may identify a cluster associated with the emoji based on the one or more display parameters associated with the emoji. For example, a color of red in an emoji may indicate that the emoji is associated with conveying a negative emotion, such as anger (e.g., if the emoji depicts a face).

The NLP device may generate the token (e.g., model input) based on identifying the cluster (e.g., the semantic meaning cluster) associated with the cluster. This may reduce a quantity of tokens needed for emojis, thereby reducing a complexity of the NLP model and/or the NLP of the natural language input. For example, regardless of a version or type of emoji, the NLP device will generate the same token for all emojis that convey the same, or similar, meaning (e.g., based on the clustering). Additionally, this reduces a likelihood that the NLP model will generate a different output for the emojis that are intended to convey the same, or similar, meaning. For example, two different heart emojis may be grouped (e.g., by the NLP device) into the same cluster. Because all emojis included in the cluster are associated with the same token, the NLP model will generate the same output for each version of the heart emoji.

As shown by reference number 145, the NLP device may provide, to the NLP model, the one or more tokens associated with the natural language input. The NLP model may process and/or analyze the natural language input based on the one or more tokens. For example, the one or more tokens may be embedded into vectors and then processed in a neural network of the NLP model. The output of the NLP model may be a sequence of vectors in which each vector corresponds to a token with the same index. As shown by reference number 150, the NLP device may obtain, from the NLP model, an output.

The NLP model may be associated with performing one or more NLP operations. For example, an output of the NLP model may include a semantic meaning of the natural language input. As another example, the NLP model may be associated with performing speech recognition (e.g., converting voice data into text data), where an output of the NLP model includes the text data. As another example, the NLP model may be associated with performing word sense disambiguation (e.g., for selecting a meaning of a word with multiple meanings through a process of semantic analysis). For example, the output of the NLP model may include the meaning of a word, included in the natural language input, that has multiple possible meanings. As another example, the NLP model may be associated with performing sentiment analysis (e.g., where the output includes subjective qualities of the natural language input, such as attitudes, emotions, sarcasm, confusion, and/or suspicion, among other subjective qualities).

As shown in FIG. 1C, and by reference number 155, the NLP device may generate a response to the natural language input based on the output of the NLP model. For example, the response may be a natural language response (e.g., in the form of text or voice). As another example, the response may include an action performed by the NLP device. For example, the action may include obtaining data associated with an account or user, transmitting information to another device, generating user input options to be provided to the client device, and/or forwarding a call or chat session associated with the to another device or entity, among other examples.

As shown by reference number 160, the NLP device may provide or transmit, and the client device may obtain or receive, the response generated by the NLP device. For example, the client device may display a text response generated by the NLP device. As another example, the NLP device may output voice data generated by the NLP device.

As indicated above, FIGS. 1A-1C are provided as an example. Other examples may differ from what is described with regard to FIGS. 1A-1C.

Figure 2:
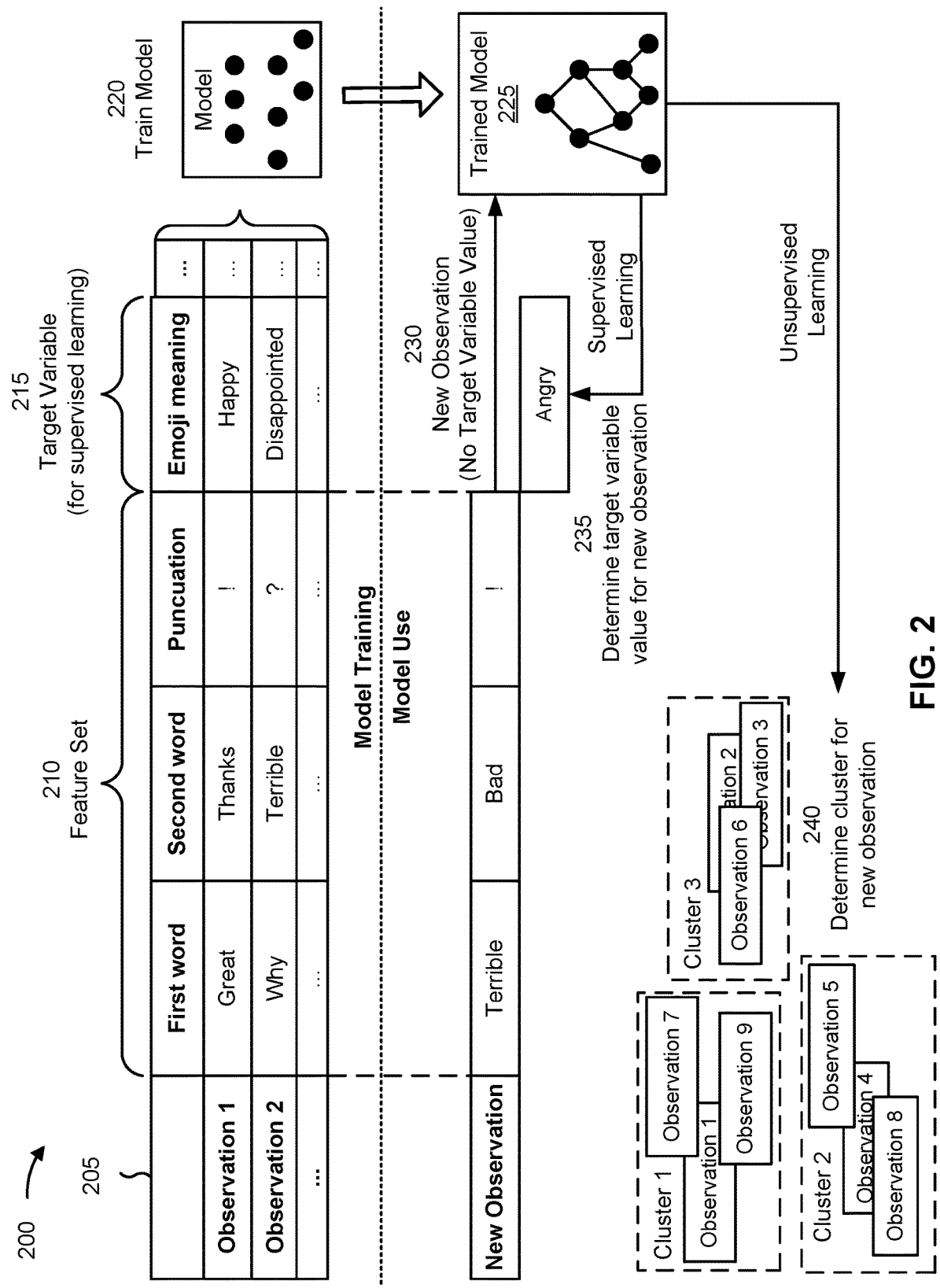
FIG. 2 is a diagram illustrating an example of training and using a machine learning model in connection with emoji sanitization for natural language model processing, in accordance with some embodiments of the present disclosure.

FIG. 2 is a diagram illustrating an example 200 of training and using a machine learning model in connection with emoji sanitization for natural language model processing. The machine learning model training and usage described herein may be performed using a machine learning system. The machine learning system may include or may be included in a computing device, a server, a cloud computing environment, or the like, such as the NLP device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the NLP device and/or the client device, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the NLP device and/or the client device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a first word (e.g., included in a natural language input that includes an emoji), a second feature of a second word (e.g., included in the natural language input), a third feature of punctuation (e.g., included in the natural language input), and so on. As shown, for a first observation, the first feature may have a value of "Great", the second feature may have a value of "Thanks", the third feature may have a value of "!", and so on. These features and feature values are provided as examples, and may differ in other examples. For example, the feature set may include one or more of the following features: an appearance modifier of the emoji, a color of the emoji, a code identifying the emoji (e.g., a hexadecimal code or a Unicode character), a category of the emoji, a name of the emoji, and/or a string of words included in the natural language input.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is emoji meaning, which has a value of "Happy" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, a neural network algorithm may be used by the machine learning system to compare an output vector of the neural network to known vectors associated with a semantic meaning. After training, the machine learning system may store the machine learning model as a trained machine learning model 225 to be used to analyze new observations.

As an example, the machine learning system may obtain training data for the set of observations based on historical data of natural language inputs provided to the NLP device. For example, the NLP device may obtain historical natural language inputs that include one or more emojis. The NLP device may obtain an indication (e.g., from a user input) indicating a semantic meaning of the emoji in context with the natural language input.

As shown by reference number 230, the machine learning system may apply the trained machine learning model 225 to a new observation, such as by receiving a new observation and inputting the new observation to the trained machine learning model 225. As shown, the new observation may include a first feature of the first word, a second feature of the second word, a third feature of punctuation, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "Angry" for the target variable of emoji meaning for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a token or model input associated with the emoji (e.g., based on the emoji meaning). The first automated action may include, for example, providing the token to an NLP model.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., associated with happy emotion emojis), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a face-affection cluster), then the machine learning system may provide a second (e.g., different) recommendation (e.g., a different token or model input) and/or may perform or cause performance of a second (e.g., different) automated action, such as providing the different token to the NLP model.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include another natural language input that is provided in response to an output (e.g., that is generated based on the output of the machine learning system). For example, the feedback information may include an indication that the output has not correctly interpreted the meaning of the emoji (e.g., a response may indicate confusion or frustration indicating that the meaning of the emoji was not correctly determined by the machine learning system).

In this way, the machine learning system may apply a rigorous and automated process to generating inputs (e.g., tokens) for emojis based on a cluster or meaning of the emoji. The machine learning system may enable recognition and/or identification of tens, hundreds, thousands, or millions of features and/or feature values for tens, hundreds, thousands, or millions of observations, thereby increasing accuracy and consistency and reducing delay associated with generating inputs (e.g., tokens) for emojis based on a cluster or meaning of the emoji relative to requiring computing resources to be allocated for tens, hundreds, or thousands of operators to manually generate inputs (e.g., tokens) for emojis based on a cluster or meaning of the emoji using the features or feature values.

As indicated above, FIG. 2 is provided as an example. Other examples may differ from what is described in connection with FIG. 2.

Figure 3:
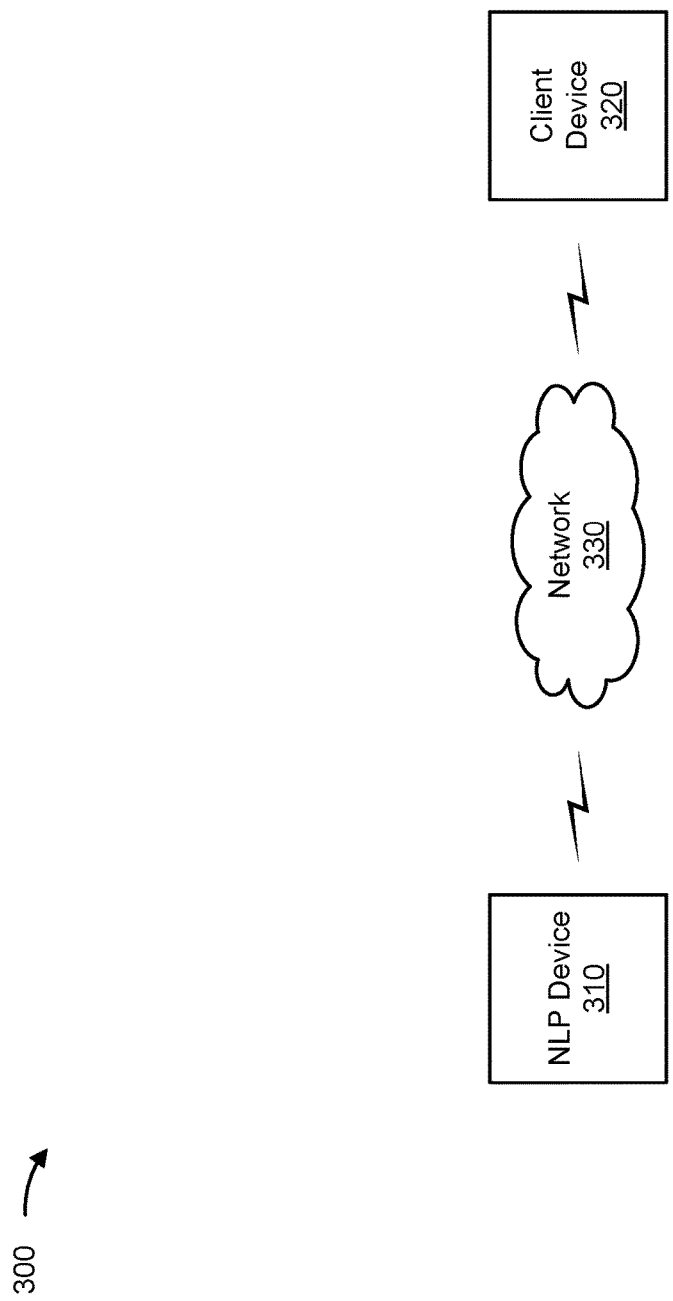
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an NLP device 310, a client device 320, and a network 330. Devices of environment 300 may interconnect via wired connections, wireless connections, or a combination of wired and wireless connections.

The NLP device 310 may include one or more devices capable of receiving, generating, storing, processing, providing, and/or routing information associated with emoji sanitization for natural language model processing, as described elsewhere herein. The NLP device 310 may include a communication device and/or a computing device. For example, the NLP device 310 may include a server, such as an application server, a client server, a web server, a database server, a host server, a proxy server, a virtual server (e.g., executing on computing hardware), or a server in a cloud computing system. In some implementations, the NLP device 310 may include computing hardware used in a cloud computing environment.

The client device 320 may include one or more devices capable of receiving, generating, storing, processing, and/or providing information associated with emoji sanitization for natural language model processing, as described elsewhere herein. The client device 320 may include a communication device and/or a computing device. For example, the client device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 330 may include one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
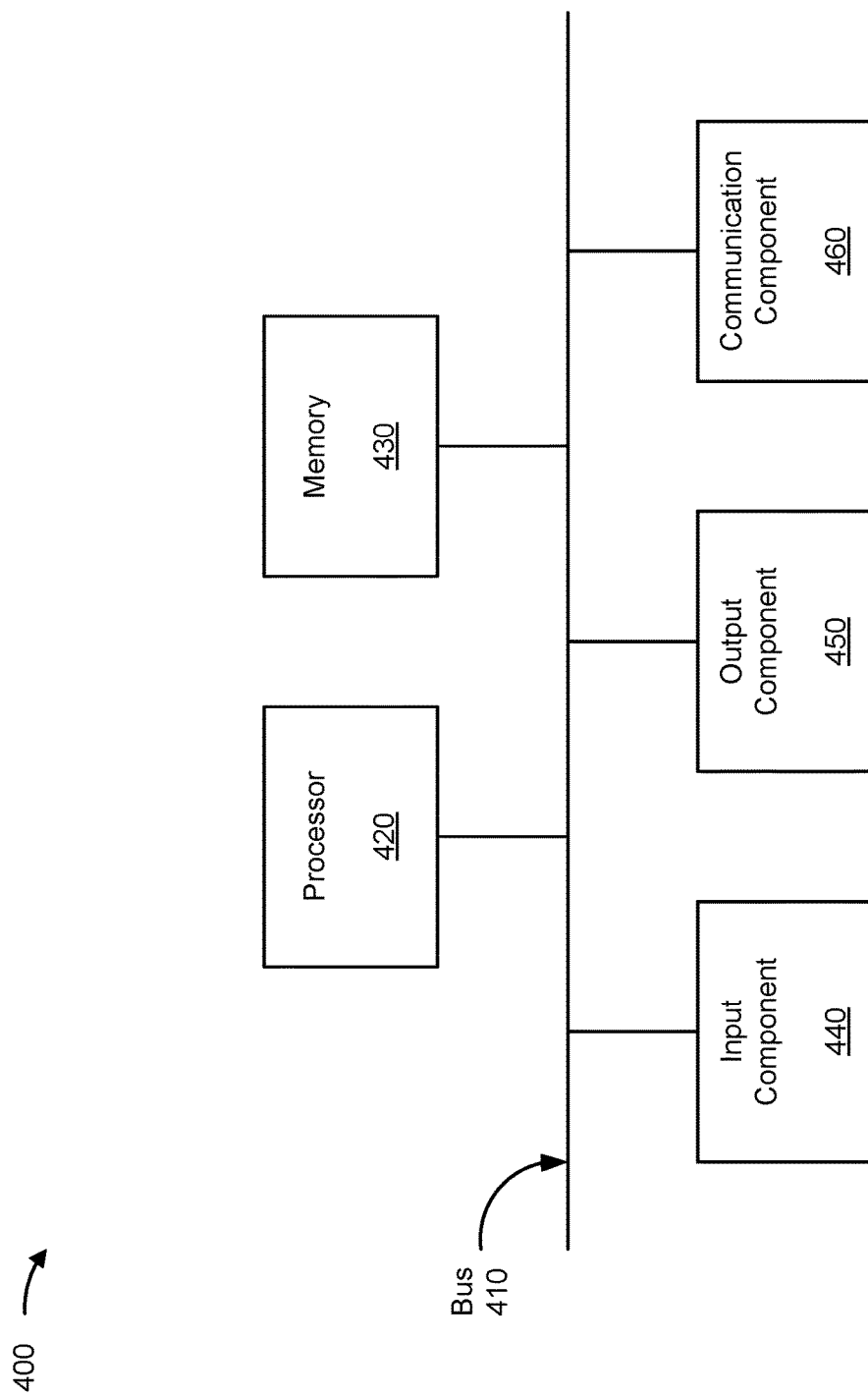
FIG. 4 is a diagram of example components of a device associated with emoji sanitization for natural language model processing, in accordance with some embodiments of the present disclosure.

FIG. 4 is a diagram of example components of a device 400 associated with emoji sanitization for natural language model processing. The device 400 may correspond to the NLP device 310 and/or the client device 320, among other examples. In some implementations, the NLP device 310 and/or the client device 320, among other examples, may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
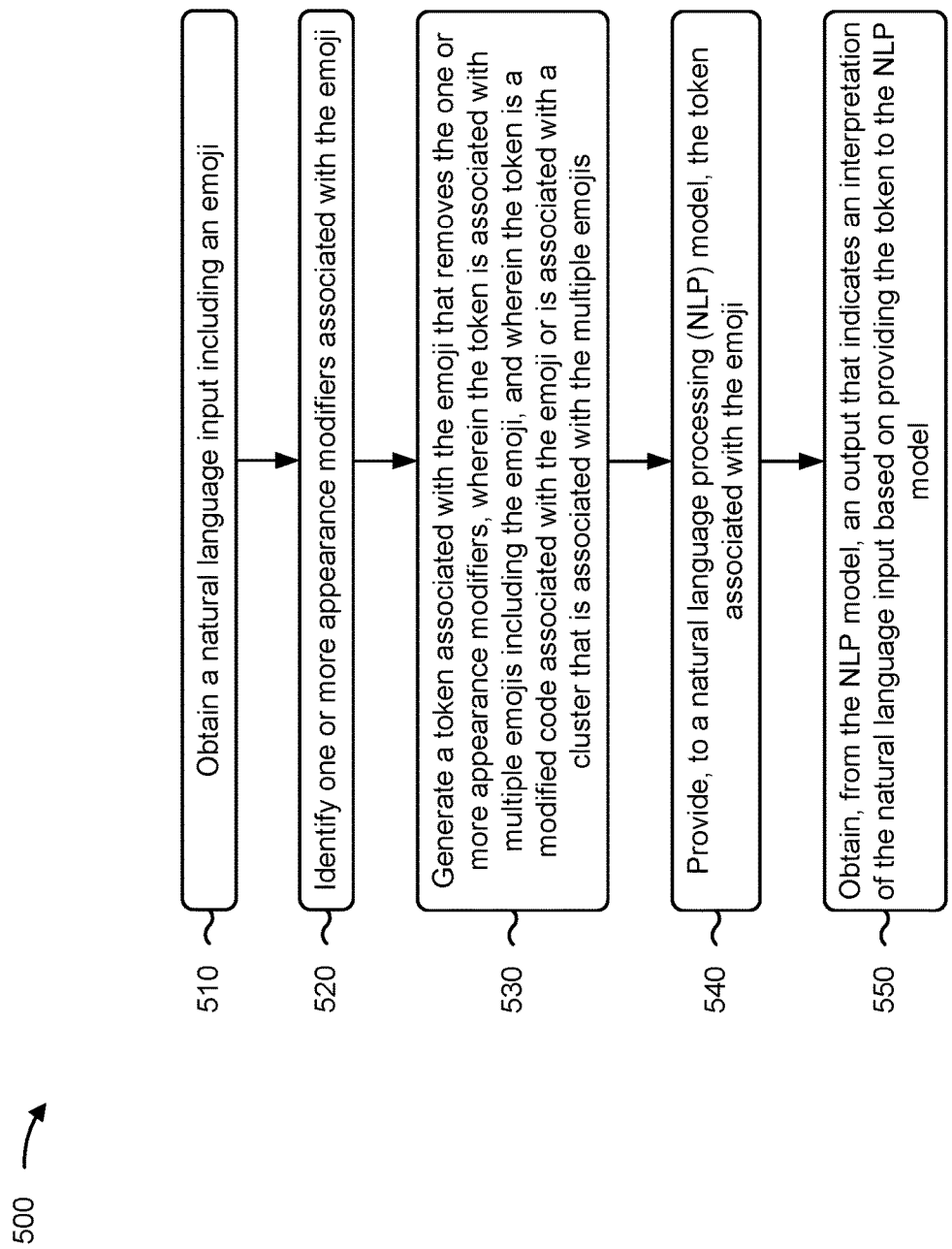
FIG. 5 is a flowchart of an example process associated with emoji sanitization for natural language model processing, in accordance with some embodiments of the present disclosure.

FIG. 5 is a flowchart of an example process 500 associated with emoji sanitization for natural language model processing. In some implementations, one or more process blocks of FIG. 5 may be performed by the NLP device 310. In some implementations, one or more process blocks of FIG. 5 may be performed by another device or a group of devices separate from or including the NLP device 310, such as the client device 320. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining a natural language input including an emoji (block 510). For example, the NLP device 310 (e.g., using processor 420 and/or memory 430) may obtain a natural language input including an emoji, as described above in connection with reference number 110 of FIG. 1A. As an example, the client device 320 may provide, and the NLP device 310 may obtain, the natural language input that includes the emoji as part of a chatbot session.

As further shown in FIG. 5, process 500 may include identifying one or more appearance modifiers associated with the emoji (block 520). For example, the NLP device 310 (e.g., using processor 420 and/or memory 430) may identify one or more appearance modifiers associated with the emoji, as described above in connection with reference number 125 of FIG. 1B. As an example, the NLP device 310 may identify the one or more appearance modifiers based on a code (e.g., an embedded code included in the natural language input identifying the emoji) and/or based on an image analysis of an image of the emoji.

As further shown in FIG. 5, process 500 may include generating a token associated with the emoji that removes the one or more appearance modifiers (block 530). In some implementations, the token is associated with multiple emojis including the emoji. In some implementations, the token is a modified code associated with the emoji or is associated with a cluster that is associated with the multiple emojis. For example, the NLP device 310 (e.g., using processor 420 and/or memory 430) may generate a token associated with the emoji that removes the one or more appearance modifiers, as described above in connection with reference numbers 120, 125, 130, 135, and/or 140 of FIG. 1B. As an example, the NLP device 310 may generate the token by removing references to appearance modifiers associated with the emoji and generating the token for the emoji itself (e.g., without appearance modifiers). As another example, the NLP device 310 may generate the token by grouping the emoji into a cluster (e.g., a cluster that is associated with emojis having the same, or similar, meaning) and identifying the token associated with the cluster.

As further shown in FIG. 5, process 500 may include providing, to an NLP model, the token associated with the emoji (block 540). For example, the NLP device 310 (e.g., using processor 420 and/or memory 430) may provide, to an NLP model, the token associated with the emoji, as described above in connection with reference number 145 of FIG. 1B. As an example, the NLP device 310 may tokenize the natural language input (e.g., including the emoji, as described above). The NLP device 310 may provide the one or more tokens to be processed by a neural network of the NLP model.

As further shown in FIG. 5, process 500 may include obtaining, from the NLP model, an output that indicates an interpretation of the natural language input based on providing the token to the NLP model (block 550). For example, the NLP device 310 (e.g., using processor 420 and/or memory 430) may obtain, from the NLP model, an output that indicates an interpretation of the natural language input based on providing the token to the NLP model, as described above in connection with reference number 150 of FIG. 1B. As an example, the output of the NLP model may include a semantic meaning or an interpretation of the natural language input. Additionally, or alternatively, the output may include an estimated or recommended response to the natural language input (e.g., where the estimated or recommended response is based on the semantic meaning or an interpretation of the natural language input).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C and 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for emoji sanitization for natural language model processing, the system comprising:
    one or more memories; and
    one or more processors, communicatively coupled to the one or more memories, configured to:
    obtain a natural language input including an emoji,
        wherein the emoji is associated with an appearance modifier;
    generate a model input associated with the emoji based on an emoji identifier associated with the emoji,
        wherein the model input is associated with multiple emojis including the emoji,
        wherein the model input sanitizes the emoji by removing a code corresponding to the appearance modifier, and
        wherein the multiple emojis are associated with a semantic meaning cluster;
    provide, to a natural language processing (NLP) model, the model input associated with the emoji; and
    obtain, from the NLP model and based on providing the model input to the NLP model, an output that indicates a semantic meaning of the natural language input.

2. The system of claim 1, wherein the one or more processors are further configured to:
    train the NLP model using one or more model inputs, including the model input, that are associated with respective semantic meaning clusters of emojis, including the semantic meaning cluster.

3. The system of claim 1, wherein the one or more processors, to generate the model input, are configured to:
    provide the natural language input to a machine learning model,
        wherein the machine learning model is trained to identify semantic meanings of emojis; and
    group the emoji into the semantic meaning cluster based on an output of the machine learning model,
        wherein the model input is a common input for all emojis grouped into the semantic meaning cluster.

4. The system of claim 1, wherein the one or more processors, to generate the model input, are configured to:
    classify, based on one or more rules and the emoji identifier associated with the emoji, the emoji into the semantic meaning cluster; and
    identify the model input based on the semantic meaning cluster.

5. The system of claim 1, wherein the emoji identifier associated with the emoji includes the code corresponding to the appearance modifier.

6. The system of claim 1, wherein the emoji identifier associated with the emoji includes a hexadecimal code, a decimal code, or a hypertext markup language (HTML) code.

7. The system of claim 1, wherein the one or more processors are further configured to:
provide a response to the natural language input,
wherein the response is based on the semantic meaning of the natural language input, and
wherein the response is a text response or a voice response.

8. The system of claim 1, wherein the one or more processors, to generate the model input, are configured to:
perform image analysis of the emoji to determine one or more display parameters associated with the emoji;
identify the semantic meaning cluster based on the one or more display parameters associated with the emoji; and
generate the model input based on identifying the semantic meaning cluster.

9. The system of claim 1, wherein the model input is a common input for the multiple emojis.

10. A method for emoji sanitization for natural language model processing, comprising:
obtaining, by a device, a natural language input including an emoji;
identifying, by the device, one or more appearance modifiers associated with the emoji;
generating, by the device and based on using a machine learning model to group the emoji into a cluster, a token associated with the emoji that removes the one or more appearance modifiers,
wherein the token is associated with multiple emojis associated with the cluster, including the emoji, and
wherein the token is a modified code associated with the emoji or is associated with the cluster;
providing, by the device and to a natural language processing (NLP) model, the token associated with the emoji; and
obtaining, by the device and from the NLP model, an output that indicates an interpretation of the natural language input based on providing the token to the NLP model.

11. The method of claim 10, wherein the NLP model is trained using one or more tokens, including the token, that are associated with respective semantic meanings of emojis.

12. The method of claim 10, wherein identifying the one or more appearance modifiers associated with the emoji comprises:
identifying the one or more appearance modifiers based on at least one of:
a code associated with the emoji, or
image analysis of the emoji.

13. The method of claim 10, wherein the one or more appearance modifiers include at least one of:
a color modifier,
a skin tone modifier, or
a version modifier.

14. The method of claim 10, wherein generating the token comprises:
providing the natural language input to the machine learning model,
wherein the machine learning model is trained to identify semantic meaning of emojis; and
grouping the emoji into the cluster based on an output of the machine learning model.

15. The method of claim 10, wherein the token is a common input into the NLP model for all emojis included in the cluster.

16. The method of claim 10, wherein the natural language input includes a code identifying the emoji, and wherein generating the token comprises:
removing a portion of the code corresponding to the one or more appearance modifiers to obtain the modified code.

17. A non-transitory computer-readable medium storing a set of instructions, the set of instructions comprising:
one or more instructions that, when executed by one or more processors of a device, cause the device to:
obtain a natural language input including an emoji,
wherein the emoji is associated with an appearance modifier;
generate, based on classifying the emoji into a semantic meaning cluster, a model input associated with the emoji based on an identifier associated with the emoji,
wherein the model input is associated with multiple emojis including the emoji,
wherein the model input does not indicate the appearance modifier, and
wherein the multiple emojis are associated with the semantic meaning cluster;
provide, to a natural language processing (NLP) model, the model input associated with the emoji; and
obtain, from the NLP model, an output that indicates a semantic meaning of the natural language input based on providing the model input to the NLP model.

18. The non-transitory computer-readable medium of claim 17, wherein the one or more instructions, that cause the device to generate the model input, cause the device to:
provide the natural language input to a machine learning model,
wherein the machine learning model is trained to identify semantic meaning of emojis; and
group the emoji into the semantic meaning cluster based on an output of the machine learning model,
wherein the model input is a common input for all emojis grouped into the semantic meaning cluster.

19. The non-transitory computer-readable medium of claim 17, wherein the one or more instructions, that cause the device to generate the model input, cause the device to:
classify, based on one or more rules and the identifier associated with the emoji, the emoji into the semantic meaning cluster; and
identify the model input based on the semantic meaning cluster.

20. The non-transitory computer-readable medium of claim 17, wherein the identifier associated with the emoji includes a hexadecimal code.

* * * * *